United States Patent
Park et al.

(10) Patent No.: US 11,713,025 B2
(45) Date of Patent: Aug. 1, 2023

(54) AIR BLOWING APPARATUS

(71) Applicants: HYUNDAI MOTOR COMPANY, Seoul (KR); KIA MOTORS CORPORATION, Seoul (KR); NIFCO KOREA Inc., Asan-si (KR)

(72) Inventors: Jong Min Park, Seoul (KR); Nak Kyoung Kong, Seongnam-si (KR); Seung Hyeok Chang, Suwon-si (KR); Ki Hong Lee, Seoul (KR); Jae Hyoung Kim, Asan-si (KR); Heung Hwan Lim, Asan-si (KR)

(73) Assignees: HYUNDAI MOTOR COMPANY, Seoul (KR); KIA MOTORS CORPORATION, Seoul (KR); NIFCO KOREA INC., Asan-si (KR)

( * ) Notice: Subject to any disclaimer, the term of this patent is extended or adjusted under 35 U.S.C. 154(b) by 379 days.

(21) Appl. No.: 17/036,824

(22) Filed: Sep. 29, 2020

(65) Prior Publication Data
US 2021/0129800 A1    May 6, 2021

(30) Foreign Application Priority Data
Oct. 30, 2019   (KR) ........................ 10-2019-0136140

(51) Int. Cl.
*B60S 1/54* (2006.01)
*B60S 1/52* (2006.01)

(52) U.S. Cl.
CPC .. *B60S 1/54* (2013.01); *B60S 1/52* (2013.01)

(58) Field of Classification Search
CPC .... B60S 1/56; B60S 1/528; B60S 1/52; B60S 1/54; B60S 1/548
USPC .......................................... 15/313
See application file for complete search history.

(56) References Cited

U.S. PATENT DOCUMENTS

| 7,972,203 | B2 * | 7/2011 | Raghuprasad | B60S 1/54 |
| | | | | 416/223 R |
| 8,322,776 | B2 | 12/2012 | Fioravanti | |
| 2017/0259788 | A1 | 9/2017 | Villa-Real | |

FOREIGN PATENT DOCUMENTS

DE   202017005995 U1 *   1/2018
KR   20040015456 A       2/2004

* cited by examiner

*Primary Examiner* — Katina N. Henson
(74) *Attorney, Agent, or Firm* — Lempia Summerfield Katz LLC (57) ABSTRACT

An air blowing apparatus is oriented toward a windshield glass of a vehicle and includes an air fan assembly located adjacent to the windshield glass and an air nozzle connected to the air fan assembly via a duct such that a fluid flows therebetween. The air nozzle is located so as to be opposite the windshield glass and is configured to adjust the pressure and angle at which air is discharged toward the windshield glass in accordance with the driving environment of a vehicle.

20 Claims, 6 Drawing Sheets

ANGLE OF COVER: 40 DEGREES,
ANGLE OF BLADE: 20 DEGREES

ANGLE OF COVER: 50 DEGREES,
ANGLE OF BLADE: 30 DEGREES

SECTION D-D

AIR BLOWING APPARATUS

CROSS-REFERENCE TO RELATED APPLICATION

This application claims under 35 U.S.C. § 119(a) the benefit of priority to Korean Patent Application No. 10-2019-0136140 filed on Oct. 30, 2019, the entire contents of which are incorporated herein by reference.

BACKGROUND

(a) Technical Field

The present disclosure relates to an air blowing apparatus. More particularly, it relates to an air blowing apparatus including a nozzle oriented toward a windshield glass of a vehicle and a nozzle cover configured to cover the nozzle. An angle at which the nozzle cover is opened is controlled in accordance with the driving environment of the vehicle such that compressed air is effectively discharged toward the windshield glass in order to secure a clear view.

(b) Background Art

Figure 1:
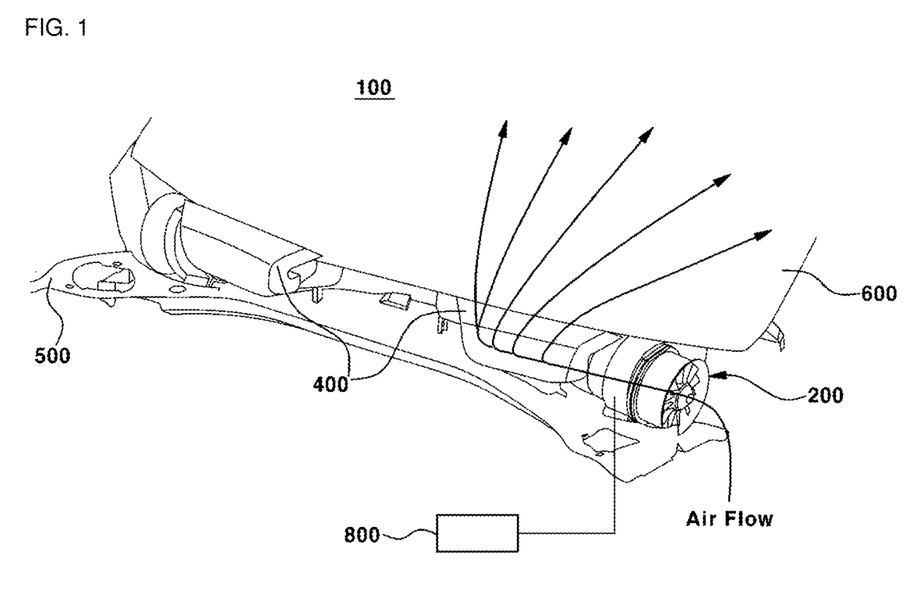
FIG. 1 is a perspective view of an air blowing apparatus installed to a cowl top cover assembly according to an embodiment of the present disclosure.

In general, a vehicle is provided having a windshield glass with a wiper system, as shown in FIG. 1.

A wiper system is configured to operate along the surface of the windshield glass in order to secure a clear view, particularly in rainy weather.

In addition, washer liquid is sprayed through a washer liquid nozzle simultaneously with the operation of the wiper system so that a wiper arm of the wiper system wipes the windshield glass, thereby providing a clear view to the driver.

The above-described conventional wiper system is configured such that a wiper arm thereof performs a reciprocating movement while being in contact with the windshield glass. However, this operation of the wiper arm obstructs the driver's view. In addition, the wiper arm is a consumable part that needs to be frequently replaced.

Since recently developed hybrid electric vehicles or plug-in hybrid electric vehicles are capable of being driven by electrical energy, the role of a typical engine is reduced. The size of the engine is also reduced, thus increasing the amount of available space at the front of the vehicle.

Therefore, proposed is technology for discharging compressed air toward the windshield glass using an air fan located at the front side of the vehicle in order to provide a clear view to a driver, particularly in rainy weather.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide an air blowing apparatus employing air blowing technology for discharging compressed air to a windshield glass in order to secure a clear view.

It is another object of the present disclosure to provide an air blowing apparatus capable of controlling the pressure and the horizontal (left-right) angle at which air is discharged in accordance with the driving environment of a vehicle.

It is a further object of the present disclosure to provide an air blowing apparatus capable of preventing the occurrence of vibration and noise of a nozzle cover.

The objects of the present disclosure are not limited to the above-mentioned objects. Other objects not mentioned herein should be clearly understood by those having ordinary skill in the art from the following description and should become apparent with reference to the embodiments of the present disclosure. In addition, the objects of the present disclosure can be accomplished by the components described in the appended claims and combinations thereof.

An air blowing apparatus for a vehicle for achieving the objects of the present disclosure includes the following configurations.

In one aspect, the present disclosure provides an air blowing apparatus including a cowl top cover assembly located so as to be opposite a windshield glass, an air fan assembly located inside the cowl top cover assembly, and an air nozzle connected to the air fan assembly via a duct such that a fluid flows therebetween, the air nozzle being opposite the windshield glass. The air nozzle is configured to adjust the pressure and angle at which air is discharged toward the windshield glass in accordance with the driving environment of a vehicle.

In an embodiment, the air fan assembly may include a housing located inside the cowl top cover assembly, a motor assembly located inside the housing, a blade configured to receive rotational force from the motor assembly, and a flow guide cover configured to guide flow of air suctioned by rotation of the blade.

In another embodiment, the air nozzle may include a nozzle housing including an opening connected to the duct and oriented toward the windshield glass, a nozzle configured to discharge air introduced from the air fan assembly toward the opening, a nozzle blade configured to guide flow of the discharged air in a horizontal direction, and a nozzle cover configured to be opened when the pressure of the air that is discharged is greater than or equal to a predetermined value.

In still another embodiment, the angle at which the nozzle cover is opened may be determined depending on the traveling speed of the vehicle.

In yet another embodiment, the air blowing apparatus may further include an angle restriction boss provided on the inner surface of the nozzle cover and configured to control the angle at which the nozzle blade is inclined in the horizontal direction. The angle at which the nozzle blade is inclined in the horizontal direction may be determined depending on the angle at which the nozzle cover is opened.

In still yet another embodiment, the angle restriction boss may be configured such that the angle at which the nozzle blade is inclined in the horizontal direction increases when the angle at which the nozzle cover is opened increases.

In a further embodiment, the air blowing apparatus may further include a support member provided at one end of the nozzle cover inside the nozzle cover and configured to support an opened state of the nozzle cover.

In another further embodiment, the air blowing apparatus may further include a latching member located at a portion in the air nozzle that corresponds to the position of the support member. The latching member may be configured to fix the support member.

In still another further embodiment, the latching member may support the nozzle cover in a manner such that one end of the latching member catches on at least one support tooth formed at the support member.

In yet another further embodiment, the air blowing apparatus may further include a protruding member formed adjacent to the latching member and a hinge member located adjacent to the support member so as to be opposite the protruding member. When the nozzle cover is completely opened, the protruding member may come into contact with the hinge member such that the latching member is released from the support member.

In still yet another further embodiment, the air blowing apparatus may further include an elastic member provided at a rotation center shaft of the nozzle cover and configured to apply elastic force to the nozzle cover such that the nozzle cover returns to a closed state.

In a still further embodiment, the air blowing apparatus may further include a controller configured to control the pressure and angle at which air is discharged toward the windshield glass through the air nozzle.

In a yet still further embodiment, the controller may control the amount of compressed air that is discharged through the air nozzle based on the driving environment of the vehicle. The driving environment of the vehicle may include data on the traveling speed of the vehicle received from a speed sensor and data on the amount of rainwater detected by a rain sensor.

In a yet still further embodiment, upon receiving a user's request for spraying washer liquid, the controller may control the air fan assembly to maximize the amount of compressed air that is discharged through the air nozzle.

In a yet still further embodiment, the controller may control the angle at which the nozzle cover is opened and the amount of compressed air that is discharged to improve aerodynamic performance in accordance with the driving environment of the vehicle.

In a yet still further embodiment, the air blowing apparatus may further include a washer nozzle located adjacent to the air nozzle. The air nozzle may be configured to discharge compressed air and the washer nozzle may be configured to spray washer liquid.

In a yet still further embodiment, the air blowing apparatus may further include a spring provided inside the nozzle housing, the spring being configured to apply elastic force to the nozzle blade in a lateral direction of the vehicle.

In a yet still further embodiment, the housing may be located inside the cowl top cover assembly.

Other aspects and embodiments of the disclosure are discussed below.

It should be understood that the terms "vehicle" or "vehicular" or other similar terms as used herein are inclusive of motor vehicles in general. Such motor vehicles may encompass: passenger automobiles including sports utility vehicles (SUV), buses, trucks, and various commercial vehicles; watercraft including a variety of boats and ships; aircraft and the like; and alternative fuel vehicles including hybrid vehicles, electric vehicles, plug-in hybrid electric vehicles, and hydrogen-powered vehicles (e.g. fuels derived from resources other than petroleum). As referred to herein, a hybrid vehicle is a vehicle that has two or more sources of power, for example vehicles that are both gasoline-powered and electric-powered.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, are determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. The present disclosure may, however, be embodied in many different forms, and should not be construed as being limited to the embodiments set forth herein. Rather, these embodiments are provided so that the disclosure is more thorough and complete, and will more fully convey the scope of the disclosure to those having ordinary skill in the art.

The terms "unit" and "assembly" used in the specification mean units for processing at least one function or operation, and may be implemented using hardware components, software components, or combinations thereof.

In addition, the terms "opening amount" and "opening angle" used in the specification indicate the degree to which a nozzle cover 430 is opened, and have the same meaning.

Further, the terms "horizontal opening amount" and "horizontal opening angle" used in the specification indicate an angle at which a nozzle blade 420 is inclined in a lateral direction of a vehicle with respect to a longitudinal direction of a vehicle.

In addition, the term "closed state" of the nozzle cover 430 described in the specification means the state in which a discharge port of the nozzle housing 410 is covered with the nozzle cover 430.

In addition, although an air blowing apparatus is described in the specification as being located inside a cowl top cover assembly, the present disclosure is not limited thereto. An air blowing apparatus may be located in a region adjacent to a windshield glass or may be located inside a bonnet or on a roof of a vehicle. Hereinafter, an air blowing apparatus located inside a cowl top cover assembly is described in the specification.

The present disclosure relates to an air blowing apparatus 100 configured to be opposite a windshield glass 600, and more particularly to an air blowing apparatus 100 that is located adjacent to the windshield glass 600 in order to remove foreign substances from the windshield glass 600 and to improve the aerodynamic performance of the vehicle in accordance with the driving environment of the vehicle.

FIG. 1 is a perspective view of an air blowing apparatus 100 according to the present disclosure. The air blowing apparatus 100 is located inside a cowl top cover assembly 500 provided adjacent to the windshield glass 600. The air blowing apparatus 100 includes a nozzle having a discharge port that is oriented toward the windshield glass 600.

Specifically, the air blowing apparatus 100 includes an air nozzle 400 located inside each end portion of the cowl top cover assembly 500 opposite the windshield glass 600. Air that is introduced into a lateral portion of the air blowing apparatus 100 is compressed by an air fan assembly 200. The compressed air flows along a duct 300, which interconnects the air fan assembly 200 and the air nozzle 400. The compressed air is discharged toward the windshield glass 600 through the air nozzle 400.

The air fan assembly 200 includes a flow guide cover 240 configured to guide the flow of air introduced thereinto and a blade 230 configured to compress air flowing along the flow guide cover 240.

In addition, the air fan assembly 200 further includes a housing 210 having two open opposite ends. Air passing through the flow guide cover 240 is compressed by the blade 230, which is rotatably coupled to a motor assembly 220. The compressed air flows to the air nozzle 400 through the open end of the housing 210, which is coupled to the duct 300.

A controller 800 may include an electronic control unit (ECU) provided in the vehicle. The controller 800 is configured to receive information about the amount of rainwater detected by a rain sensor and information about the current traveling speed of the vehicle, measured by a speed sensor, an acceleration sensor, or the like.

In addition, the controller 800 is configured to control the driving of the motor assembly 220 so as to control the rotational force of the blade 230 of the air fan assembly 200.

Thus, the controller 800 according to the present disclosure may control the amount of air introduced into the air fan assembly 200 in accordance with the driving environment of the vehicle. The controller 800 may control the degree to which the introduced air is compressed by controlling the driving of the motor assembly 220.

In addition, upon receiving a user's request for spraying washer liquid, the controller 800 according to the present disclosure may control the air fan assembly 200 to maximize the amount of air that is compressed in response to the user input for spraying washer liquid. In this case, the controller 800 may perform controls such that either the amount of air that is compressed or the amount of air that is discharged is maximized or such that both the amount of air that is compressed and the amount of air that is discharged are maximized.

Figure 2:
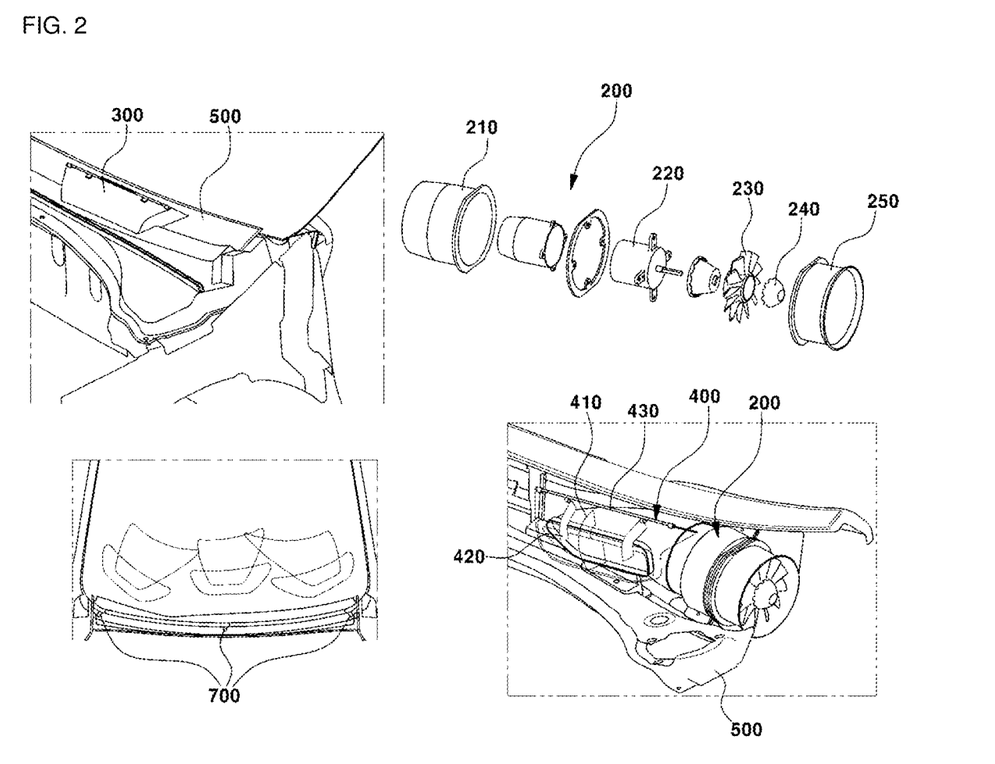
FIG. 2 is a constitutional view of the air blowing apparatus according to an embodiment of the present disclosure.
Figure 3:
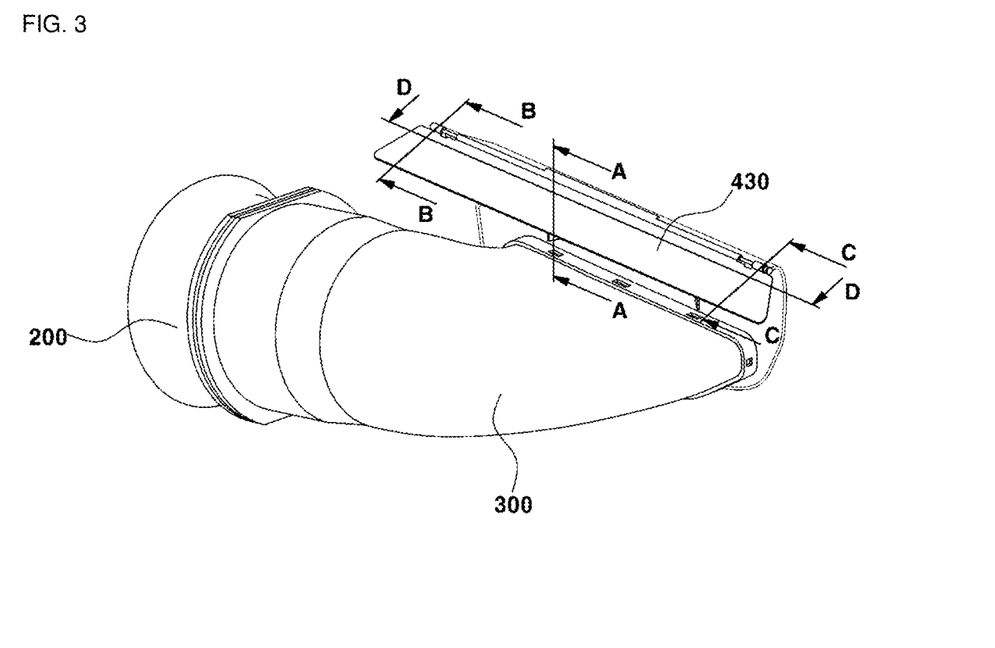
FIG. 3 is a constitutional view of an air fan assembly and an air nozzle of the air blowing apparatus according to an embodiment of the present disclosure.

FIGS. 2 and 3 illustrate the coupling relationships between the components of the air blowing apparatus 100.

As illustrated, the air blowing apparatus 100 includes the air fan assembly 200, which is secured to the cowl top cover assembly 500, and the duct 300, which interconnects the air fan assembly 200 and the air nozzle 400 such that a fluid flows therebetween.

As described above, the air fan assembly 200 includes the housing 210 having two open opposite ends, the flow guide cover 240 configured to guide the flow of air introduced into the housing 210, and the blade 230 located adjacent to the flow guide cover 240 and configured to receive rotational force from the motor assembly 220.

In addition, the air fan assembly 200 is configured such that air is introduced thereinto from the lateral surface of the vehicle. To this end, one open end of the housing 210 may be located adjacent to the lateral surface of the vehicle.

The housing 210, which is located adjacent to the lateral surface of the vehicle, is coupled to a cover unit 250 so as to prevent the blade 230 from being exposed to the outside.

According to an embodiment of the present disclosure, the air fan assembly 200 may be disposed in the lateral direction of the vehicle such that one open end of the housing 210 is opposite the lateral surface of the vehicle.

Air introduced into the housing 210 through one open end of the housing 210 flows along the flow guide cover 240 and is compressed by the rotational force of the blade 230. The compressed air is discharged from the housing 210 through the opposite open end of the housing 210.

The compressed air, which is discharged from the housing 210 through the opposite open end of the housing 210, flows into the duct 300 through one end of the duct 300. The opposite end of the duct 300 is coupled to one end of the nozzle housing 410 of the air nozzle 400.

The nozzle housing 410 according to the present disclosure may include a nozzle for discharging compressed air in the direction in which the one end of the nozzle housing 410 that is coupled to the duct 300 is oriented. In detail, the nozzle housing 410 includes an opening formed in the lower end thereof to be coupled to the duct 300. The nozzle housing 410 further includes a nozzle provided at the upper end thereof, the nozzle being opposite the windshield glass 600 and being configured to discharge compressed air toward the windshield glass 600.

The blade 230 is configured such that the rotational speed thereof is controlled by the controller 800. According to an embodiment of the present disclosure, the driving of the motor assembly 220 is controlled by the controller 800, and the rotational speed of the blade 230 is controlled by the motor assembly 220. In this manner, the pressure to which the introduced air is compressed is controlled depending on the driving environment of the vehicle.

Here, the nozzle is a space through which compressed air is discharged from the nozzle housing 410 toward the windshield glass 600. Hereinafter, the term "nozzle" may be used to indicate the air nozzle 400.

The air nozzle 400 includes a nozzle blade 420, which is provided in the discharge space inside the nozzle housing 410 in order to guide the flow of air in the horizontal direction. The air nozzle 400 also includes a nozzle cover 430, which is configured to be opened when the pressure at which the compressed air is discharged is greater than or equal to a predetermined value.

At least one nozzle blade 420 may be provided inside the nozzle housing 410. The angle at which the nozzle blade 420 is inclined in the horizontal direction may be adjusted by an angle restriction boss 460, which is located on the inner surface of the nozzle cover 430.

In addition, the nozzle blade 420 may be coupled to a spring, which is secured to the interior of the nozzle housing 410. The spring applies elastic force to the nozzle blade 420 such that the nozzle blade 420 is biased in one direction. The angle at which the nozzle blade 420 is inclined by the elastic force of the spring applied thereto is restricted by the angle restriction boss 460.

The angle restriction boss 460 includes an inclined surface having a predetermined angle such that the angle of the nozzle blade 420 in the horizontal direction gradually increases when the distance from the windshield glass increases.

The angle of the nozzle blade 420 in the horizontal direction is restricted through the contact between the inclined surface of the angle restriction boss 460 and the nozzle blade 420. The angle at which the nozzle blade 420 is inclined in the horizontal direction may be determined depending on the angle at which the nozzle cover 430 is opened in the vertical direction.

A washer liquid nozzle 700 is provided at a portion of the cowl top cover assembly 500 that is adjacent to the air nozzle 400. Accordingly, washer liquid is sprayed toward the windshield glass 600 along with the compressed air discharged from the air nozzle 400.

The air nozzle 400 may be provided in a plural number, and the washer liquid nozzle 700 may be disposed between the air nozzles 400. The air blowing apparatus 100 according to an embodiment of the present disclosure may include two air nozzles 400 and three washer liquid nozzles 700.

The nozzle cover 430 is located in an opening in the nozzle housing 410 and is hinged to the upper end of the nozzle housing 410. The nozzle cover 430 is opened when the pressure at which the compressed air is discharged is greater than or equal to a predetermined value. The angle at which the nozzle cover 430 is opened increases in proportion to the increase in the pressure of the discharged air.

Figure 4:
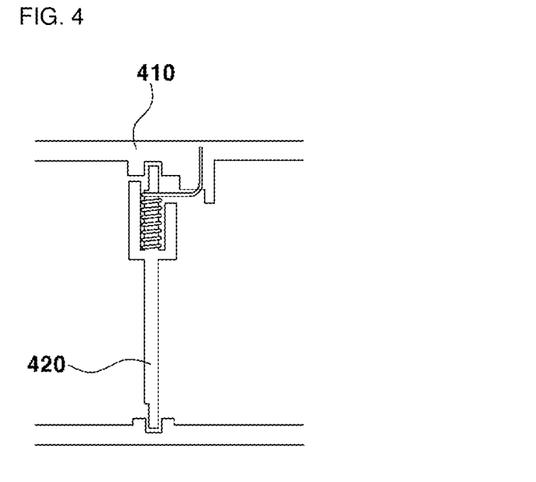
FIG. 4 is a cross-sectional view of a nozzle blade according to an embodiment of the present disclosure.
Figure 5:
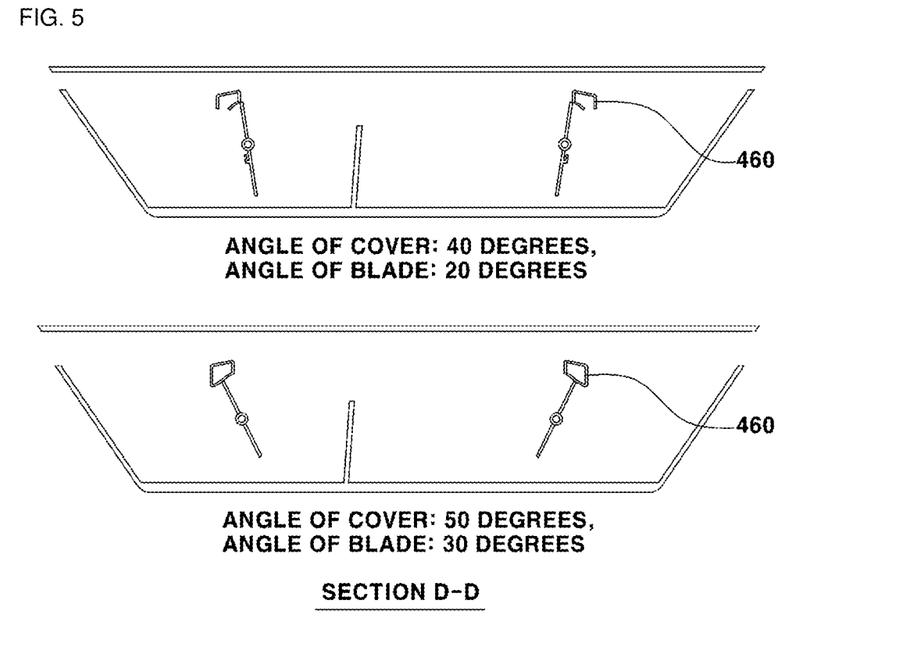
FIG. 5 is a cross-sectional view showing the angle of the nozzle blade set by an angle restriction boss according to an embodiment of the present disclosure.

FIG. 4 is a side-sectional view taken along line A-A in FIG. 3, which illustrates the coupling structure of the nozzle blade 420. FIG. 5 is a side-sectional view taken along line D-D in FIG. 3, which illustrates the coupling relationships between the nozzle blade 420 and the angle restriction boss 460 for restricting the angle at which the nozzle blade 420 is inclined in the horizontal direction.

As illustrated, a plurality of nozzle blades 420 are disposed inside the nozzle housing 410 in a longitudinal direction of the nozzle housing 410, which is substantially the same as the direction in which the compressed air flows inside the nozzle housing 410. Each nozzle blade 420 is coupled to a spring that is secured to the inner surface of the nozzle housing 410. The spring applies elastic force to the corresponding nozzle blade 420 such that one end of the nozzle blade 420 is oriented outwards with respect to the longitudinal direction of the nozzle housing 410.

The spring applies elastic force to the end of the nozzle blade 420 that is relatively close to the windshield glass in the lateral direction of the vehicle.

In an embodiment of the present disclosure, two nozzle blades 420 are provided in the nozzle housing 410, and two springs are secured to the inner surface of the nozzle housing 410. In this case, each of the two springs applies elastic force to a corresponding one of the two nozzle blades 420 such that the ends of the two nozzle blades 420 that are relatively close to the windshield glass are biased away from each other toward the respective ends of the nozzle.

The angle restriction boss 460, which is located on the inner surface of the nozzle cover 430, is configured to contact the end of each nozzle blade 420 that is opposite the end of each nozzle blade 420 to which the elastic force of the spring is applied, thereby restricting the angle at which each nozzle blade 420 is biased by the elastic force of the spring.

As described above, the angle restriction boss 460 is located on the inner surface of the nozzle cover 430, and the nozzle cover 430 is configured to be opened upwards when the pressure at which the compressed air is discharged is greater than or equal to a predetermined value. The angle restriction boss 460 is formed to be inclined such that, when the angle at which the nozzle cover is opened increases, the angle at which the nozzle blade 420 is inclined with respect to the longitudinal direction of the vehicle increases.

In addition, the angle restriction boss 460 is formed such that the height thereof gradually increases toward the interior of the discharge port of the nozzle. Accordingly, the angle restriction boss 460 is kept in contact with the nozzle blade 420 at all times so as to restrict the angle of the nozzle blade 420 even when the angle at which the nozzle cover 430 is opened increases.

In summary, the nozzle blade 420 is coupled to the spring so as to be biased in one direction at all times and is kept in contact with the angle restriction boss 460 of the nozzle cover 430 at all times so as to be maintained at a constant angle.

Furthermore, the angle restriction boss 460 may be formed such that the angle at which the nozzle blade 420 is inclined with respect to the longitudinal direction of the vehicle increases in proportion to the increase in the angle at which the nozzle cover 430 is opened. In other words, where two angle restriction bosses 460 are provided so as to correspond to two nozzle blades 420, the two angle restriction bosses 460 are formed such that the contact portions of the two angle restriction bosses 460, each of which contacts the end of a corresponding one of the two nozzle blades 420, are gradually spaced apart from each other in proportion to the increase in the angle at which the nozzle cover 430 is opened. In addition, in order to allow the nozzle blade 420 and the angle restriction boss 460 to be kept in contact with each other at all times even when the angle at which the nozzle cover 430 is opened increases, the angle restriction boss 460 is formed such that the height thereof gradually increases toward the interior of the discharge port of the nozzle.

Figure 6A:
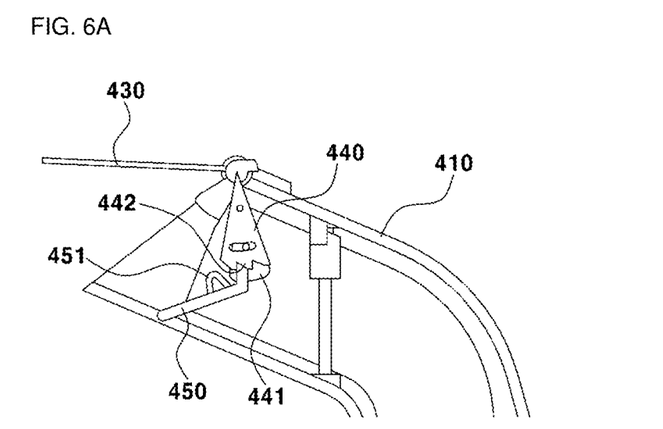
FIGS. 6A-6C are views showing the coupling relationships between a support member and a latching member in accordance with the opening angle of a nozzle cover according to an embodiment of the present disclosure.
Figure 6B:
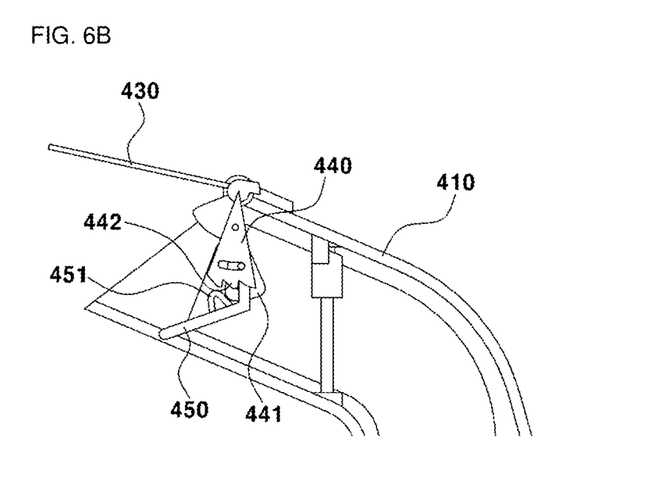
Figure 6C:
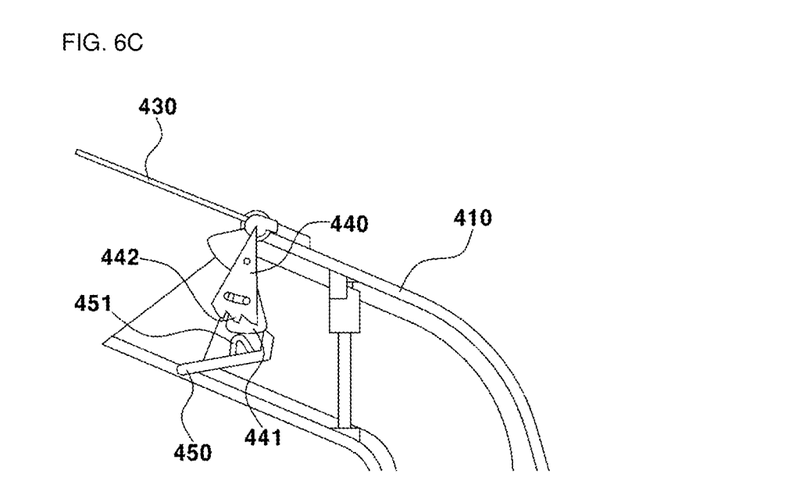

FIGS. 6A-6C are cross-sectional views taken along lines B-B and C-C in FIG. 3, which illustrate the coupling relationships between a support member 440, which is located at an end of the rear surface of the nozzle cover 430, and a latching member 450, which is located inside the nozzle housing 410 so as to correspond to the support member 440, in accordance with the angle at which the nozzle cover 430 is opened.

The air blowing apparatus 100 according to an embodiment of the present disclosure includes a support member 440, which is located at a portion of the rear surface of the nozzle cover 430 that does not interfere with the angle restriction boss 460. The support member 440 is located at each of the two opposite ends of the nozzle cover 430.

The latching member 450 is located at a portion of the inner surface of the nozzle housing 410 that corresponds to the position of the support member 440. In the state in which the nozzle cover 430 is opened, the support member 440 and the latching member 450 contact each other so as to prevent the occurrence of vibration.

The support member 440 may include a plurality of support teeth 442. One end of the latching member 450 may selectively catch on one of the support teeth 442. In detail, the latching member 450 catches on one of the support teeth 442 of the support member 440 in accordance with the degree to which the nozzle cover 430 is opened with respect to the upper end of the nozzle housing 410.

As illustrated in FIG. 6A, the air blowing apparatus 100 according to an embodiment of the present disclosure includes two support teeth 442. When the opening amount of the nozzle cover 430 is 50%, the latching member 450 catches on the first support tooth 442.

In addition, as illustrated in FIG. 6B, when the opening amount of the nozzle cover 430 is 70%, the latching member 450 catches on the second support tooth 442, thereby preventing the occurrence of vibration and noise of the nozzle cover 430.

In other words, since the latching member 450 is secured to the interior of the nozzle housing 410 and the support member 440 is integrally rotated with the nozzle cover 430, the latching member 450 selectively catches on one of the support teeth 442 in accordance with the opening amount of the nozzle cover 430.

In summary, according to an embodiment of the present disclosure, two support teeth 442 are formed, and the latching member 450 catches on one of the two support teeth 442 in accordance with the opening amount of the nozzle cover 430.

FIG. 6C illustrates the coupling relationships between the support member 440 and the latching member 450 when the nozzle cover 430 is opened at the maximum angle.

When the nozzle cover 430 is opened at the maximum angle or at a predetermined angle or more, a hinge member 441, which is located adjacent to the support member 440, comes into contact with a protruding member 451, which is formed adjacent to the latching member 450.

The hinge member 441 is located adjacent to the support member 440 in the lateral direction of the vehicle. The protruding member 451 is integrally formed with a portion of the latching member 450 that corresponds to the position of the hinge member 441.

The hinge member 441 protrudes further downwards than the support teeth 442 that are formed at one end of the support member 440 and moves in a plane corresponding to the protruding member 451. When the nozzle cover 430 is opened at a predetermined angle or more, the hinge member 441 and the protruding member 451 contact each other, and the latching member 450 is released from the support teeth 442.

When the nozzle cover 430 is opened to improve the aerodynamic performance of the vehicle, the opening amount of the nozzle cover 430 may be set such that the hinge member 441 and the protruding member 451 contact each other. In addition, when it is desired to spray washer liquid, the opening amount of the nozzle cover 430 may also be set such that the hinge member 441 and the protruding member 451 contact each other.

Furthermore, when the nozzle cover 430 is closed, the latching member 450 is released from the support member 440 through the contact between the hinge member 441 and the protruding member 451. When compressed air is discharged, the nozzle cover 430 is opened at a predetermined angle or more. Thereafter, when the amount of air that is discharged is controlled to be 0, the nozzle cover 430 covers the discharge port of the air nozzle 400. In other words, the opening angle of the nozzle cover 430 becomes 0 degrees.

Figure 7:
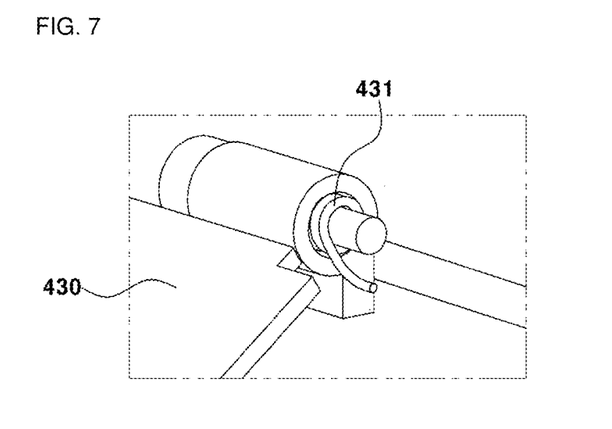
FIG. 7 is a view showing the coupling structure of the nozzle cover and an elastic member applying elastic force to the nozzle cover according to an embodiment of the present disclosure.

FIG. 7 is an enlarged view showing the structure in which the nozzle cover 430 is coupled to the nozzle housing 410 according to an embodiment of the present disclosure.

As illustrated, the nozzle cover 430 is hinged to the nozzle housing 410. To this end, the nozzle cover 430 may include a hinge shaft extending in the lateral direction of the vehicle and an elastic member 431 configured to surround the hinge shaft.

The elastic member 431 is configured to apply elastic force to the nozzle cover 430 in the direction in which the nozzle cover 430 is closed. Thus, when the latching member 450 is released from the support member 440, the nozzle cover 430 smoothly covers the discharge port of the air nozzle 400.

Figure 8:
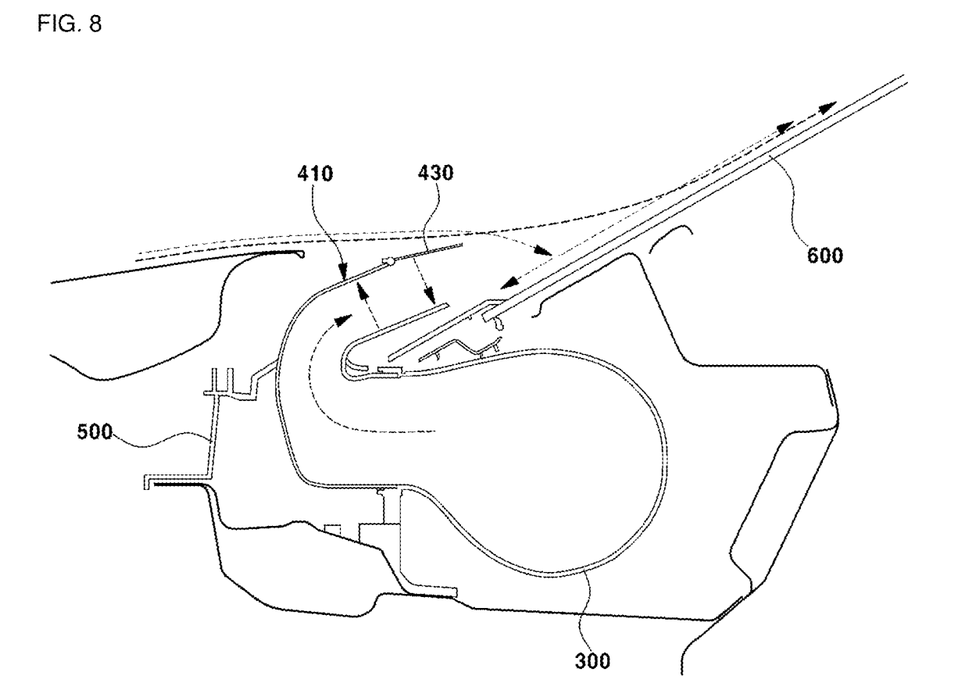
FIG. 8 is a view showing the operation of the nozzle cover for improving the aerodynamic performance of a vehicle according to an embodiment of the present disclosure.

FIG. 8 is a cross-sectional view showing the opening structure of the nozzle cover 430 for improving the aerodynamic performance of the vehicle according to another embodiment of the present disclosure.

As illustrated, the nozzle cover 430 is located between the cowl top cover assembly 500 and the windshield glass 600 that are opposite each other. The nozzle cover 430 serves to improve the aerodynamic performance in response to air resistance applied to the top surface of the windshield glass 600.

A high drag coefficient (Cd) is generated due to the difference in height among the hood of the vehicle, the cowl top cover assembly 500, and the windshield glass 600. Therefore, the opening angle of the nozzle cover 430 is controlled so as to improve the drag coefficient of the region of the vehicle from the hood to the windshield glass 600.

The controller 800 according to the present disclosure calculates a drag coefficient, which is generated at the hood and the windshield glass 600, based on the speed of the vehicle received from the speed sensor, the acceleration sensor, or the like, and increases the opening angle of the nozzle cover 430 such that the drag coefficient is minimized.

In addition, the opening angle of the nozzle cover 430 is controlled by the controller 800 in accordance with the speed of the vehicle. In this case, the controller 800 may apply driving force to the nozzle cover 430 to forcibly open the same, or may control the amount of compressed air that is discharged by driving the blade 230 of the air fan assembly 200, thereby opening the nozzle cover 430.

In order to obtain the optimum drag coefficient, the compressed air is discharged through the air nozzle 400 simultaneously with the opening of the nozzle cover 430. In detail, the compressed air discharged from the air nozzle 400 changes the direction in which air flows on the outer surface of the windshield glass 600, thereby preventing the additional occurrence of flow resistance by the windshield glass 600 and thus reducing the drag coefficient.

Figure 9:
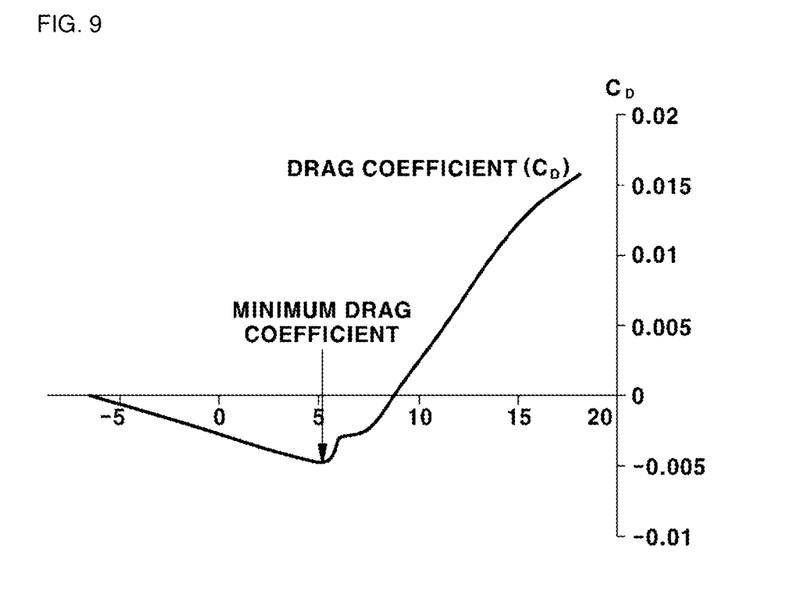
FIG. 9 is a graph showing data for obtaining improved aerodynamic performance through control of the opening angle of the nozzle cover according to an embodiment of the present disclosure.

FIG. 9 is a graph showing data for obtaining the minimum drag coefficient by changing the opening angle of the nozzle cover 430 in accordance with the speed of the vehicle.

As illustrated, when the vehicle travels at a constant speed, the angle may be set to obtain the minimum drag coefficient. The controller 800 calculates the optimum opening angle of the nozzle cover 430 for obtaining the minimum drag coefficient, and opens the nozzle cover 430 based on the calculated opening angle, thereby improving the aerodynamic performance of the vehicle.

As is apparent from the above description, the air blowing apparatus according to the present disclosure has the following effects.

Since the pressure and angle at which compressed air is discharged are controlled in accordance with the driving environment of a vehicle, it is possible to provide a clear view to a driver.

In addition, since the vibration and noise of the nozzle cover, which may be caused by discharge of air, is reduced, it is possible to provide comfort to occupants of a vehicle.

Furthermore, it is possible to improve the aerodynamic performance of a vehicle by controlling the opening angle of the nozzle cover in accordance with the driving environment of a vehicle.

The foregoing detailed description of the present disclosure is merely illustrative. The foregoing content is intended to illustrate and describe embodiments of the present disclosure, and the present disclosure may be used in various other combinations, modifications, and environments. In other words, the present disclosure may be modified or changed within the scope of the concept of the present disclosure disclosed herein, the scope equivalent to the foregoing content, and/or the scope of technology or knowledge known in the art. The embodiments described above are intended to describe the best mode for implementing the technical idea of the present disclosure, and various modifications required for specific applications and uses of the present disclosure are also possible. Thus, the foregoing detailed description is not intended to limit the present disclosure to the disclosed modes. The appended claims should be interpreted as also including other modes.

What is claimed is:

1. An air blowing apparatus comprising:
   an air fan assembly located adjacent to a windshield glass; and
   an air nozzle connected to the air fan assembly via a duct such that a fluid flows therebetween, the air nozzle being opposite the windshield glass,
   wherein the air nozzle is configured to adjust a pressure and an angle at which air is discharged toward the windshield glass in accordance with a driving environment of a vehicle, and
   wherein the air nozzle comprises:
      a nozzle housing comprising an opening connected to the duct and oriented toward the windshield glass;
      a nozzle configured to discharge air introduced from the air fan assembly toward the opening;
      a nozzle blade configured to guide flow of the discharged air in a horizontal direction; and
      a nozzle cover configured to be opened when a pressure of the air that is discharged is greater than or equal to a predetermined value.

2. The air blowing apparatus of claim 1, wherein the air fan assembly comprises:
   a housing;
   a motor assembly located inside the housing;
   a blade configured to receive rotational force from the motor assembly; and
   a flow guide cover configured to guide flow of air suctioned by rotation of the blade.

3. The air blowing apparatus of claim 2, wherein the housing is located inside a cowl top cover assembly.

4. The air blowing apparatus of claim 1, wherein an angle at which the nozzle cover is opened is determined depending on a traveling speed of the vehicle.

5. The air blowing apparatus of claim 1, further comprising:
   an angle restriction boss provided on an inner surface of the nozzle cover, the angle restriction boss being configured to control an angle at which the nozzle blade is inclined in the horizontal direction,
   wherein the angle at which the nozzle blade is inclined in the horizontal direction is determined depending on an angle at which the nozzle cover is opened.

6. The air blowing apparatus of claim 5, wherein the angle restriction boss is configured such that the angle at which the nozzle blade is inclined in the horizontal direction increases when the angle at which the nozzle cover is opened increases.

7. The air blowing apparatus of claim 1, further comprising:
   a support member provided at one end of the nozzle cover inside the nozzle cover, the support member being configured to support an opened state of the nozzle cover.

8. The air blowing apparatus of claim 7, further comprising:
   a latching member located at a portion in the air nozzle that corresponds to a position of the support member, the latching member being configured to fix the support member.

9. The air blowing apparatus of claim 8, wherein the latching member supports the nozzle cover in a manner such that one end of the latching member catches on at least one support tooth formed at the support member.

10. The air blowing apparatus of claim 8, further comprising:
    a protruding member formed adjacent to the latching member; and
    a hinge member located adjacent to the support member so as to be opposite the protruding member,
    wherein, when the nozzle cover is completely opened, the protruding member comes into contact with the hinge member such that the latching member is released from the support member.

11. The air blowing apparatus of claim 1, further comprising:
    an elastic member provided at a rotation center shaft of the nozzle cover, the elastic member being configured to apply elastic force to the nozzle cover such that the nozzle cover returns to a closed state.

12. The air blowing apparatus of claim 1, further comprising:
    a controller configured to control a pressure and an angle at which air is discharged toward the windshield glass through the air nozzle.

13. The air blowing apparatus of claim 12, wherein the controller controls an amount of compressed air that is discharged through the air nozzle based on a driving environment of the vehicle, and wherein the driving environment of the vehicle comprises data on a traveling speed of the vehicle received from a speed sensor and data on an amount of rainwater detected by a rain sensor.

14. The air blowing apparatus of claim 12, wherein, upon receiving a user's request for spraying washer liquid, the controller controls the air fan assembly to maximize an amount of compressed air that is discharged through the air nozzle.

15. The air blowing apparatus of claim 12, wherein the controller controls an angle at which the nozzle cover is opened and an amount of compressed air that is discharged to improve aerodynamic performance in accordance with a driving environment of the vehicle.

16. The air blowing apparatus of claim 1, further comprising:

a washer nozzle located adjacent to the air nozzle, the air nozzle being configured to discharge compressed air and the washer nozzle being configured to spray washer liquid.

17. The air blowing apparatus of claim 1, further comprising:

a spring provided inside the nozzle housing, the spring being configured to apply elastic force to the nozzle blade in a lateral direction of the vehicle.

18. An air blowing apparatus comprising:

an air fan assembly located adjacent to a windshield glass;

an air nozzle connected to the air fan assembly via a duct such that a fluid flows therebetween, the air nozzle being opposite the windshield glass;

a controller configured to control a pressure and an angle at which air is discharged toward the windshield glass through the air nozzle;

wherein the air nozzle is configured to adjust a pressure and an angle at which air is discharged toward the windshield glass in accordance with a driving environment of a vehicle, and wherein the controller controls an angle at which a nozzle cover is opened and an amount of compressed air that is discharged to improve aerodynamic performance in accordance with the driving environment of the vehicle.

19. The air blowing apparatus of claim 18, wherein the controller controls an amount of compressed air that is discharged through the air nozzle based on the driving environment of the vehicle, and wherein the driving environment of the vehicle comprises data on a traveling speed of the vehicle received from a speed sensor and data on an amount of rainwater detected by a rain sensor.

20. The air blowing apparatus of claim 18, wherein, upon receiving a user's request for spraying washer liquid, the controller controls the air fan assembly to maximize an amount of compressed air that is discharged through the air nozzle.

* * * * *